Patented Mar. 14, 1939

2,150,180

UNITED STATES PATENT OFFICE 2,150,180

AZO COMPOUNDS

James G. McNally and Joseph B. Dickey, Rochester, N. Y., assignors, by mesne assignments, to Eastman Kodak Company, Jersey City, N. J., a corporation of New Jersey No Drawing. Application May 12, 1936, Serial No. 79,349

15 Claims. (Cl. 260—44.6)

This invention relates to aryl azo compounds and more particularly to non-sulfonated aryl azo compounds suitable for the coloration of organic derivatives of cellulose, silk or wool, by dyeing, printing or stenciling. The invention includes the azo compounds, the process for their preparation, the process of dyeing with them and materials dyed with the non-sulfonated azo compounds of the invention.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

Of the organic derivatives of cellulose, cellulose acetate products having the characteristics just defined are of prime importance and of these, cellulose acetate silk is one of the most important. The uses for such products have increased until at the present time they have found application in many fields of industry. The development of cellulose acetate silk has, however, to some extent, been hampered by the lack of suitable dyeings and, although this difficulty has in some measure been met, there is still an active need for substances capable of satisfactorily coloring this material. Thus, while the non-sulfonated azo compounds of our invention are suitable for the coloration of organic derivatives of cellulose, silk or wool, they are of especial importance in the coloration of cellulose acetate products generally and cellulose acetate silk in particular.

The compounds of our invention consist of the aryl azo derivatives of the 1-aryl-3, 5-diketopyrazolidines and the 1-aryl-5-imino-3-ketopyrazolidines. These compounds constitute a valuable class of materials. The non-sulfonated compounds of our invention can be employed as dyes for organic derivatives of cellulose, silk or wool and produce dyeings thereon of good fastness to light and washing. The sulfonated dyes are in general not as useful for organic derivatives of cellulose, but can be employed to dye other textile materials, such as wool.

The compounds of our invention can be prepared by coupling aryl diazonium salts with the aryl diketopyrazolidines above mentioned. The preparation of these aryl diketopyrazolidines will be illustrated in connection with hte preparation of 1-phenyl-3, 5-diketopyrazolidine and 1-phenyl-5-imino-3-ketopyrazolidine, but it will be understood that the aryl compounds, other than phenyl, of 3-5-diketopyrazolidine and 5-imino-3-ketopyrazolidine can be prepared in similar fashion. Again, while the preparation of the compounds of our invention will be illustrated with reference to the aryl azo compounds of 1-phenyl-3, 5-diketopyrazolidine and 1-phenyl-5-imino-3-ketopyrazolidine, or their substituted derivatives, it will be understood that the aryl azo compounds of other 1-aryl-3, 5-diketopyrazolidines and other 1-aryl-5-imino-3-ketopyrazolidines or their substituted derivatives, can be prepared in accordance with the directions hereinafter given.

1-phenyl-3, 5-diketopyrazolidine can be prepared in known manner by the condensation of phenyl hydrazine with malonic ester. The preparation of this compound is described more fully on page 93 of Richter's Organic Chemistry by D'Albe, vol. 3 (1923). Its constitution is believed to be represented by the following formula:

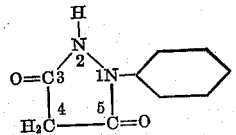

The prepartion of 1-phenyl-3, 5-diketopyrazolidine is illustrative of the manner of preparation of other 1-aryl-3, 5-diketopyrazolidines which can be obtained by the condensation of aryl hydrazines with malonic ester. 1-naphthyl and 1-diphenyl-3, 5-diketopyrazolidine can be prepared, for example, by condensing naphthyl hydrazine and diphenyl hydrazine, respectively, with malonic ester. By the use of nuclear substituted aryl hydrazines substituted derivatives of the 1-aryl-3, 5-diketopyrazolidines can be obtained having various substituents on the aryl nucleus. The aryl azo derivatives of such nuclear substituted compounds are included as within the scope of our invention.

The aryl azo compounds of the 1-aryl-3, 5-diketopyrazolidines or their substituted derivatives, are prepared, in accordance with the process of our invention, by coupling with aryl diazonium salts. The reaction takes place readily in alkaline solution to produce colored compounds having the probable structure

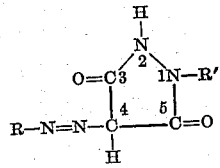

wherein R and R' represent aryl nuclei, advantageously, of the benzene or naphthalene series which may be substituted, for example, with $NO_2$, a halogen atom, an alkyl group, an alkoxy group, an acyl group or a hydroxyl group.

1-phenyl-5-imino-3-ketopyrazolidine can be prepared by heating cyanacetic ethyl ester with phenyl hydrazine in absolute alcohol with sodium according to the directions given in Berichte der deutschen chemischen Gesellschaft, vol. 39, p. 2287 (1906). In a similar manner 1-naphthyl-5-imino-3-ketopyrazolidine and 1-diphenyl-5-imino-3-ketopyrazolidine can be prepared by substituting naphthyl hydrazine or diphenyl hydrazine, respectively, for phenyl hydrazine. The aryl azo compounds of the 1-aryl-5-imino-3-ketopyrazolidines can be prepared by coupling with diazotized primary aryl amines which may have nuclear substituents. Similarly, the 1-aryl (substituted)-5-imino-3-ketopyrazolidines can be prepared by coupling with a diazotized primary aryl amine which may have nuclear substituents.

The probable structure of the aryl azo compounds of the 1-aryl-5-imino-3-ketopyrazolidines is:

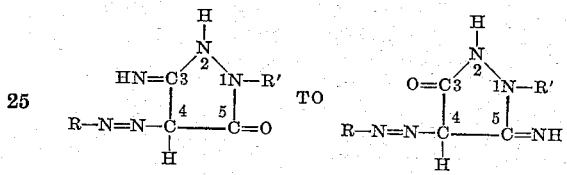

wherein R and R' represent aryl nuclei which may be substituted, for example, with NO₂, a halogen atom, an alkyl group, an alkoxy group or an acyl group. Advantageously, R and R' are aryl nuclei of the benzene or naphthalene series, such as phenyl, diphenyl or naphthyl.

The following examples will illustrate the method of preparation of the azo compounds of our invention. Quantities are expressed in parts by weight.

*Example 1*

12.3 parts of o-anisidine are dissolved in 200 parts of water containing 30 parts of 36% hydrochloric acid. The solution is then cooled by the addition of ice or by external cooling to about 0–5° C. and the o-anisidine diazotized by the addition of 6.9 parts of sodium nitrite while maintaining the temperature at about 0–5° C.

17.6 parts of 1-phenyl-3,5-diketopyrazolidine are dissolved in 400 parts of water containing 30 parts of sodium carbonate. The solution is cooled by the addition of ice, for example, and the diazo solution prepared as described above is slowly added with stirring. When coupling is complete the mixture is made acid to litmus with acetic acid, after which the precipitated azo compound of o-anisidine and 1-phenyl-3,5-diketopyrazolidine is filtered, washed and dried.

*Example 2*

13.8 parts of p-nitroaniline are added to 200 parts of water containing about 36 parts of 36% hydrochloric acid. The resulting solution is then cooled to a temperature approximating 0–5° C. and the p-nitroaniline diazotized by the addition of 6.9 parts of sodium nitrite.

20.6 parts of p-methoxy-1-phenyl-3,5-diketopyrazolidine are dissolved in 400 parts of water containing 16 parts of sodium hydroxide. The resulting solution is cooled by the addition of ice, for example, and the diazo solution is slowly added with stirring. Upon completion of the coupling reaction, the mixture is made acid to litmus with hydrochloric acid, after which the precipitated azo compound is filtered, washed and dried.

*Example 3*

172.5 parts of o-nitro-p-chloro-aniline are dissolved in an aqueous hydrochloric acid solution and diazotized in the usual manner by the addition of sodium nitrite.

24.5 parts of 1-(2,4-dichloro)-phenyl-3,5-diketopyrazolidine are dissolved in 400 parts of water containing 30 parts of sodium carbonate, and the resulting solution coupled in the usual manner with the diazo solution of o-nitro-p-chloro-aniline. When coupling is complete, the mixture is made acid to litmus with acetic acid, after which the precipitated azo compound is filtered, washed and dried.

*Example 4*

11.1 parts of p-fluoro-aniline are dissolved in 200 parts of water containing about 30 parts of 36% hydrochloric acid. The resulting solution is cooled to a temperature approximating 0–5° C. by the addition of ice or by any other suitable means, and the p-fluoro-aniline diazotized by the addition of 6.9 parts of sodium nitrite while maintaining the temperature at about 0–5° C.

17.6 parts of 1-phenyl-3,5-diketopyrazolidine are dissolved in a dilute sodium carbonate solution and coupled in the usual manner with the diazotized solution prepared as described above. Upon completion of the coupling reaction, the mixture is made acid to litmus by the addition of acetic acid or hydrochloric acid, for example, after which the precipitated azo compound of p-fluoro-aniline and 1-phenyl-3,5-diketopyrazolidine is filtered, washed and dried.

*Example 5*

A solution is prepared by dissolving 14.3 parts of α-naphthylamine in 200 parts of water containing about 36 parts of 36% hydrochloric acid. The solution is cooled by the addition of ice to a temperature approximating 0–5° C. and the amine diazotized by the addition of 6.9 parts of sodium nitrite while maintaining this temperature.

17.6 parts of 1-phenyl-3,5-diketopyrazolidine are dissolved in 250 parts of water containing 30 parts of sodium carbonate. The resulting solution is cooled by the addition of ice, for example, and the diazo solution prepared as described above is slowly added with stirring. Upon completion of the coupling reaction, the mixture is made acid to litmus with acetic acid and the precipitated azo compound of α-naphthylamine and 1-phenyl-3,5-diketopyrazolidine is filtered, washed and dried. Cellulose acetate is dyed a yellowish-orange from an aqueous suspension of the dye.

*Example 6*

13.7 parts of o-phenetidine are dissolved in 200 parts of water containing about 36 parts of 36% hydrochloric acid. The resulting solution is cooled by the addition of ice, for example, and diazotized by the addition of 6.9 parts of sodium nitrite dissolved in a small amount of water.

The diazo solution thus prepared is slowly added to a solution of 17.5 parts of 1-phenyl-5-imino-3-ketopyrazolidine dissolved in 300 parts of water containing 20 parts of sodium carbonate. After coupling is complete, the resulting alkaline solution is made acid to litmus with acetic acid, and the precipitated orange-colored azo compound is filtered, washed and dried.

Example 7

20.7 parts of 2.6-dichloro-4-nitroaniline are dissolved in 55 parts of 100% sulfuric acid and the resulting solution cooled. This solution is mixed with a cold solution of 6.9 parts of sodium nitrite in 37 parts of 100% sulfuric acid. The resulting solution is further cooled externally, and then diluted by the addition of 105 parts of glacial acetic acid and cooled to 15° C. The mixture is stirred until diazotization is complete, usually several hours, after which it is added to a cold solution of 17.5 parts of 1-phenyl-5-imino-3-ketopyrazolidine dissolved in 105 parts of glacial acetic acid. Sodium acetate is then added until the sulfuric acid present is neutralized. When coupling is complete, the azo compound of 2,6-dichloro-4-nitroaniline and 1-phenyl-5-imino-3-ketopyrazolidine is precipitated by the addition of water, after which it is filtered, washed and dried.

Example 8

16.8 parts of 2-amino-5-nitroanisole are dissolved by warming in 200 parts of water and 36 parts of 36% hydrochloric acid. The resulting solution is diazotized in the usual manner by the addition of 6.9 parts of sodium nitrite dissolved in a small amount of water.

The diazo solution thus prepared is coupled with a solution of 17.5 parts of 1-phenyl-5-imino-3-ketopyrazolidine dissolved in 300 parts of water containing 20 parts of sodium carbonate. The coupling operation should be carried out at a low temperature, 0–5° C. for example, with the gradual addition of the diazo solution. Upon completion of the coupling operation, the azo compound of 2-amino-5-nitroanisole and 1-phenyl-5-imino-3-ketopyrazolidine is precipitated by the addition of acetic acid, after which it is filtered, washed and dried.

Example 9

34.7 parts of disodium-2-amino-naphthalene-4.8-disulfonate are dissolved in 200 parts of water. The solution is well cooled and 60 parts of 36% hydrochloric acid are added with vigorous stirring. The resulting solution is diazotized in the usual manner by the gradual addition of a concentrated solution of 6.9 parts of sodium nitrite, and the mixture stirred until diazotization is complete.

17.5 parts of 1-phenyl-5-imino-3-ketopyrazolidine are dissolved in 100 parts of water containing 32 parts of sodium carbonate. Coupling is effected by slowly adding the diazo solution to this solution. Advantageously, the coupling reaction is conducted while maintaining a temperature of about 0–5° C. for example. After coupling is complete, the resulting azo compound is precipitated by the addition of sodium chloride, filtered, washed and dried.

Example 10

13.6 parts of p-aminodimethylaniline dissolved in 200 parts of water containing about 48 parts of 36% hydrochloric acid are diazotized in the usual manner by the addition of a concentrated solution of 6.9 parts of sodium nitrite. The diazo solution prepared as above is slowly added to a well iced solution of 17.5 parts of 1-phenyl-5-imino-3-ketopyrazolidine dissolved in 300 parts of water containing 30 parts of sodium carbonate with active stirring. After reaction is complete, usually about thirty minutes, the dye is precipitated by acidifying the solution with acetic acid and the azo compound of 1-phenyl-5-imino-3-ketopyrazolidine and p-aminodimethylaniline filtered, washed and dried.

Example 11

12.3 parts of o-anisidine are dissolved in 150 parts of water comprising about 30 parts of 36% hydrochloric acid and diazotized in the usual manner by the addition of 6.9 parts of sodium nitrite.

20.6 parts of o-methoxy 1-phenyl-3,5-diketopyrazolidine are dissolved in 250 parts of water containing 31 parts of sodium carbonate. Coupling is effected by slowly adding the diazo solution prepared above to this solution while cooling and stirring. When coupling is complete, the mixture is made acid to litmus with acetic acid and the precipitated azo compound is filtered, washed and dried.

Example 12

13.1 parts of iso-cresidine

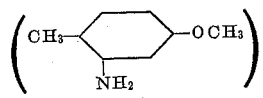

are diazotized with sodium nitrite in the usual manner.

22.1 parts of p-nitro-1-phenyl-3,5-diketopyrazolidine are dissolved in 250 parts of water containing 31 parts of sodium carbonate. The resulting solution is then cooled to a temperature of 0–5° C., for example, and the diazo solution prepared above is slowly added with stirring. Upon completion of the coupling reaction the mixture is made acid to litmus with acetic acid after which the azo compound formed by the coupling reaction is filtered, washed and dried.

Example 13

12.3 parts of p-anisidine are dissolved in 150 parts of water and ice containing about 30 parts of 36% hydrochloric acid and diazotized in the usual manner by the addition of 6.9 parts of sodium nitrite.

The solution thus prepared is added with stirring to a cooled solution of 20.5 parts of p-methoxy-1-phenyl-5-imino-3-ketopyrazolidine dissolved in 300 parts of water containing 30 parts of sodium carbonate. Coupling is advantageously effected while maintaining a temperature of 0–5° C. Upon completion of the coupling reaction, the alkaline mixture is made acid to litmus with acetic acid, after which the precipitated azo compound can be recovered by filtering, washing and drying.

Example 14

13.5 parts of p-aminoacetophenone are dissolved in 150 parts of water containing about 30 parts of 36% hydrochloric acid and diazotized in the usual manner by the addition of 6.9 parts of sodium nitrite.

25.4 parts of m-bromo-1-phenyl-5-imino-3-ketopyrazolidine are dissolved in 300 parts of water containing 30 parts of sodium carbonate. The resulting solution is then cooled by the addition of ice, for example, and the diazo solution prepared above is slowly added with stirring. When coupling is complete, the mixture is made acid to litmus with acetic acid, after which the precipitated dye compound can be recovered by filtering, washing and drying.

The above examples illustrating suitable methods of preparing a number of compounds of our invention are not to be considered as limiting it to the specific conditions shown, as various modifications within the scope thereof can be made. The following tabulation will further illustrate the compounds included within the scope of our invention together with the color they produce on cellulose acetate silk:

| Coupling agent | Amine | Color on cellulose acetate silk |
|---|---|---|
| 1-phenyl-3,5-diketopyrazolidine. | o-Chloroaniline | Yellow. |
| Do | o-Methoxyaniline | Do. |
| Do | o-Ethoxyaniline | Do. |
| Do | p-Ethoxyaniline | Do. |
| Do | m-Ethoxyaniline | Do. |
| Do | m-Nitroaniline | Brown. |
| Do | p-Nitroaniline | Do. |
| Do | p-Aminoacetophenone. | Yellow. |
| Do | p-Aminophenol | Do. |
| 1-(2,4) dinitro-phenyl-3,5-diketopyrazolidine. | o-Ethoxyaniline | Brown. |
| Do | m-Nitroaniline | Do. |
| 1-phenyl-5-imino-3-ketopyrazolidine. | Nitro-p-phenylene diamine. | Orange-yellow. |
| Do | Dimethyl aniline | Red. |
| Do | Diethyl aniline | Do. |
| Do | p-Nitro aniline | Tan. |
| Do | Aniline | Do. |
| Do | Anisidine | Mustard. |
| Do | Phenetidine | Do. |
| Do | o-Nitro aniline | Olive yellow. |
| Do | o-Chloro benzene | Tan. |
| Do | p-Amino acetophenone. | Gold. |
| Do | α-Naphthylamine | Red. |
| Do | o-Nitro toluidine | Gold. |
| Do | o-Chloro-p-nitro aniline. | Olive yellow. |
| Do | p-Aminoacetanilide | Tan. |
| Do | 4-nitro anisidine | Orange red. |

In empoying the non-sulfonated aryl azo derivatives of our invention as dyes they will ordinarily be applied to the material in the form of an aqueous suspension which can be prepared by grinding the dye to a paste in the presence of soap or other suitable dispersing agent and dispersing the resulting paste in water. Dyeing operations can, with advantage, be conducted at a temperature of 80–85° C., but any suitable temperature may be used. In accordance with the usual dyeing practice, the material to be dyed will ordinarily be added to the dye bath at a temperature lower than that at which the main portion of the dyeing is to be effected, a temperature approximately 45–55° C., for example, following which the temperature of the dye bath will be raised to that selected for carrying out the dyeing operation. The temperature at which the dyeing is conducted will vary, depending for example, on the method selected for applying the dye and the particular material or materials undergoing coloration.

It will be understood that the non-sulfonated aryl azo compounds may be applied to the material to be colored in any suitable manner. Coloration may be effected, for example, by dyeing, printing or stenciling. Dispersing or solubilizing agents that can be employed for preparing suspensions of the dye include soap, sulphoricinoleic acid, a salt of sulphoricinoleic acid, and sulfonated oleic, stearic or palmitic acid, or salts thereof such for instance as the sodium or ammonium salts.

While it is preferred to effect coloration by applying the dye compound directly to the material to be colored, the non-sulfonated aryl azo compounds of our invention may be applied using the methods applicable to the so-called ice colors. According to this method of dyeing a non-sulfonated aryl amine is absorbed and diazotized on the fiber after which the dye is formed in situ by developing with the diketopyrazolidine coupling agents of the invention. Conversely the material may be treated to absorb a diketopyrazolidine coupling agent and the dye subsequently formed in situ by coupling with a non-sulfonated aryl diazonium salt.

The non-sulfonated aryl azo compounds of our invention in general color natural silk and wool the same shade as cellulose acetate and, accordingly, they may be used for the union dyeing of these materials. On the other hand, however, they possess little or no affinity for cotton or viscose and, consequently, they may be used to produce cross-dye effects on fabrics or substances containing either or both of these materials and a material which is colored by them. Using the non-sulfonated aryl azo derivatives of 1-phenyl-3,5-diketopyrazolidine, or its phenyl substituted derivatives, cellulose acetate silk may be dyed a color ranging from yellow to brown of excellent fastness to light and washing. Similarly, using the non-sulfonated aryl azo derivatives of 1-phenyl-5-imino-3-ketopyrazolidine, or its phenyl substituted derivatives, cellulose acetate silk may be dyed a color ranging from red to olive yellow.

The following example illustrates one satisfactory way in which dyeing may be carried out in accordance with our invention.

*Example 15*

2.5 parts of o-methoxy benzene azo-4,3,5-diketopyrazolidine are finely ground with soap and dispersed in 1000 parts of water. The dispersion thus prepared is heated to a temperature approximately 45–55° C. and 100 parts of cellulose acetate silk, in the form of taffeta or threads, for example, are added to the dye bath after which the temperature is gradually raised to 80–85° C. and the silk worked for several hours at this latter temperature. Upon completion of the dyeing operation, the cellulose acetate silk is removed, washed with soap, rinsed and dried. The cellulose acetate silk is dyed a deep yellow shade.

It will be understood that the dyeing operations can be carried out in a manner similar to that above by the substitution of another material which can be colored by the non-sulphonated aryl azo compounds of our invention in place of cellulose acetate silk, or by employing a dye compound of the invention other than o-methoxy benzene-azo 4,3,5-diketopyrazolidine, or by substitution of both the material being dyed and the dye compound of the example.

The non-sulphonated aryl azo compounds of our invention possess a further advantage in that they are soluble in organic solvents, such as acetone and Cellosolve Acetate (ethyleneglycolmonoethylether acetate), for example, and may be used to color lacquers, plastic masses and the like. In general, any solvent for cellulose acetate, or more broadly, for lacquer, plastic masses and the like, which is also a solvent for the dye compound, may be used.

What we claim as our invention and desire to secure by Letters Patent of the United States is:

1. The azo dyes having the general formula:

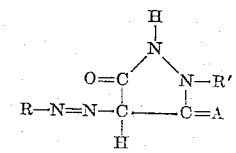

wherein R and R' each represent an aryl group selected from the group consisting of the benzene and naphthalene series and A represents a substituent selected from the group consisting of oxygen and the imino group.

2. The azo dyes having the general formula:

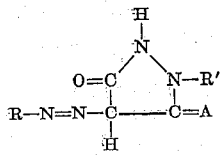

wherein R represents an aryl group selected from the group consisting of the benzene and naphthalene series, R' represents a phenyl group and A represents a substituent selected from the group consisting of oxygen and the imino group.

3. The azo dyes having the general formula:

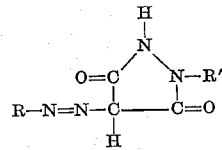

wherein R represents an aryl group selected from the group consisting of the benzene and naphthalene series and R' represents a phenyl group.

4. The azo dyes having the general formula:

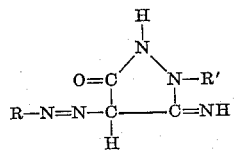

wherein R represents an aryl group selected from the group consisting of the benzene and naphthalene series and R' represents a phenyl group.

5. The azo dyes having the general formula:

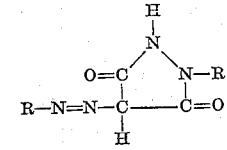

wherein R represents a member selected from the group consisting of a naphthyl group and a phenyl group which may be substituted with substituents selected from the group consisting of a halogen atom, an alkoxy group, a nitro group, an acyl group, a hydroxyl group and an alkyl group, and R' represents a phenyl group which may be substituted with substituents selected from the group consisting of a nitro group, an alkoxy group, a halogen atom, an acyl group, a hydroxyl group and an alkyl group.

6. The azo dyes having the general formula:

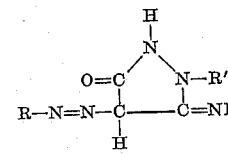

wherein R represents a member selected from the group consisting of a naphthyl group which may be substituted with a sulfonic group and a phenyl group which may be substituted with substituents selected from the group consisting of an alkoxy group, a nitro group, a halogen atom, an acyl group, an alkyl group and an alkyl substituted amino group and R' represents a phenyl group which may be substituted with substituents selected from the group consisting of an alkoxy group, a halogen atom, a nitro group, an acyl group and an alkyl group.

7. A process of preparing azo dye compounds which comprises coupling a diazotized primary aromatic amine selected from the group consisting of the benzene and naphthalene series with a compound represented by the general formula:

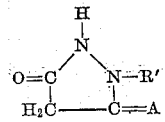

wherein R' represents an aryl group selected from the group consisting of the benzene and naphthalene series and A represents a substituent selected from the group consisting of oxygen and the imino group.

8. A process of preparing azo dye compounds which comprises coupling a diazotized primary aromatic amine selected from the group consisting of the benzene and naphthalene series with a compound represented by the general formula:

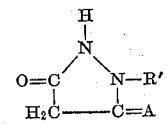

wherein R' represents a phenyl group and A represents a substituent selected from the group consisting of oxygen and the imino group.

9. The azo dyes having the general formula: X—N=N—Y wherein X represents the radical of an azo component selected from the group consisting of the benzene and naphthalene series and Y represents the residue of a compound selected from the group consisting of 1-aryl-3,5-diketopyrazolidines and 1-aryl-5-imino-3-ketopyrazolidines, wherein the aryl residue represents an aryl residue selected from the group consisting of the benzene and naphthalene series.

10. The azo dyes having the general formula: X—N=N—Y wherein X represents the radical of an azo component selected from the group consisting of the benzene and naphthalene series and Y represents the residue of a 1-phenyl-3,5-diketopyrazolidine.

11. The azo dyes having the general formula: X—N=N—Y wherein X represents the radical of an azo component selected from the group consisting of the benzene and naphthalene series and Y represents the residue of a 1-phenyl-5-imino-3-ketopyrazolidine.

12. The azo dyes having the general formula:

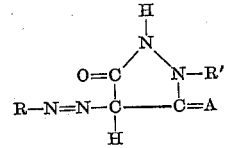

wherein R and R' each represent a phenyl group and A represents a substituent selected from the group consisting of oxygen and the imino group.

13. The azo dyes having the general formula:

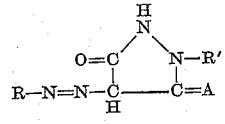

wherein R represents the residue of an azo component of the benzene series, R' represents a member selected from the group consisting of an aryl nucleus of the benzene series and an aryl nucleus of the naphthalene series and A represents a substituent selected from the group consisting of oxygen and the imino group.

14. The azo dyes having the general formula:

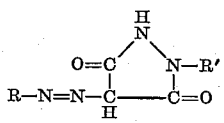

wherein R represents the residue of an azo component of the benzene series and R' represents an aryl nucleus of the benzene series.

15. The azo dyes having the general formula:

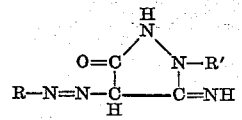

wherein R represents the residue of an azo component of the benzene series and R' represents an aryl nucleus of the benzene series.

JAMES G. McNALLY.
JOSEPH B. DICKEY.

Certificate of Correction

Patent No. 2,150,180. March 14, 1939.

JAMES G. McNALLY ET AL.

It is hereby certified that error appears in the printed specification of the above numbered patent requiring correction as follows: Page 2, first column, lines 21 to 28 inclusive, for

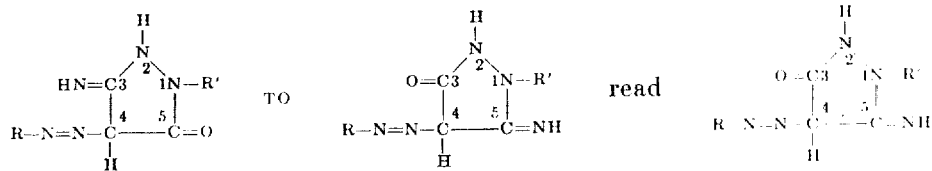

and that the said Letters Patent should be read with this correction therein that the same may conform to the record of the case in the Patent Office.

Signed and sealed this 2nd day of May, A. D. 1939.

[SEAL]

Henry Van Arsdale
*Acting Commissioner of Patents.*